US008831562B2

(12) United States Patent
Bhatia et al.

(10) Patent No.: US 8,831,562 B2
(45) Date of Patent: Sep. 9, 2014

(54) SYSTEM AND METHOD FOR USING NETWORK IDENTIFICATION INFORMATION TO MANAGE MOBILE WIRELESS USER SERVICE POLICIES

(75) Inventors: Sumeet Singh Bhatia, Hoffman Estates, IL (US); Claudio Taglienti, Barrington Hills, IL (US); Narayanan Haran, Hoffman Estates, IL (US); Narothum Saxena, Hoffman Estates, IL (US); Michael Shannon Irizarry, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 0 days.

(21) Appl. No.: 13/523,458

(22) Filed: Jun. 14, 2012

(65) Prior Publication Data

US 2013/0337769 A1     Dec. 19, 2013

(51) Int. Cl.
*H04M 11/00*     (2006.01)

(52) U.S. Cl.
USPC ........................................................ 455/406

(58) Field of Classification Search
USPC ........ 455/466, 432.1, 433, 456.3, 436, 456.1, 455/434, 406, 461; 370/329, 331
See application file for complete search history.

(56) References Cited

U.S. PATENT DOCUMENTS

| 2004/0192297 | A1* | 9/2004 | Erskine et al. | 455/432.1 |
| 2005/0147069 | A1* | 7/2005 | Rink et al. | 370/338 |
| 2009/0011780 | A1* | 1/2009 | Salinas et al. | 455/466 |
| 2011/0223909 | A1* | 9/2011 | D'Souza et al. | 455/432.1 |
| 2011/0281582 | A1* | 11/2011 | Jiang | 455/433 |

* cited by examiner

*Primary Examiner* — Kiet Doan
(74) *Attorney, Agent, or Firm* — Leydig, Voit & Mayer, Ltd.

(57) ABSTRACT

A system and method are described that enable policy-implementing modules in a mobile wireless network to identify the location of a user and render policy-based (e.g., quality of service, accounting, throttling, etc.) decisions based upon a variety of additional information such as: home network availability in a market, user class, time of day, network congestion, application type, etc. The system renders policy decisions, based upon geo-spatial location information, by receiving a mobile wireless data message including a geospatial identifier. Thereafter, a policy engine renders a data service policy decision by applying a policy to the geospatial identifier. The potential classifications identified by the data service policy decision include an in-market roaming mode wherein a data usage is treated as non-roaming, even though associated with a roaming data session, based upon an in-market location specified by the geospatial location information.

19 Claims, 5 Drawing Sheets

| BSID | PCF IP Address | User ID |
|------|----------------|---------|
| 200  | 202            | 204     |

FIG. 2

| BSID | PCF IP Address | User Session ID |
|------|----------------|-----------------|
| 300  | 302            | 304             |

FIG. 3

| SID 1 | SID 2 | ... | SID "n" |
|-------|-------|-----|---------|
| 400   | 402   |     | 404     |

FIG. 4

SYSTEM AND METHOD FOR USING NETWORK IDENTIFICATION INFORMATION TO MANAGE MOBILE WIRELESS USER SERVICE POLICIES

FIELD OF THE INVENTION

This invention relates generally to the field of mobile wireless communications networks and associated services. More particularly, the invention is directed to mobile wireless data communication services (such as those supporting data flows to/from smart phones) in such networks, and more specifically to managing wireless network data resource utilization on an individual user basis in accordance with subscriber policy agreements relating to mobile wireless service subscribers utilize provided data communications services.

BACKGROUND OF THE INVENTION

Proliferation of smart phones, and their subsequent use to perform high data-rate communication, has resulted in an exponential growth in the volume of data flowing over wireless networks. The increased volume of data flowing over the networks is taxing the service providers and the legacy network infrastructure responsible for ensuring the data flows at acceptable rates for most, if not all, users.

Furthermore, the introduction of a new generation of networks based upon fourth generation (4G) mobile wireless standards (e.g., "Long Term Evolution" or "LTE" and Mobile WiMAX) and associated communications infrastructure has substantially increased the throughput capabilities of mobile wireless networks for users that subscribe to and use 4G services. Thus, 4G technology has the capability of relieving the stresses currently being experienced by 3G systems arising from the proliferation of mobile wireless devices (e.g., smart phones, tablet computers, etc.).

There is thus substantial interest by mobile wireless service providers to have users migrate to 4G systems where such systems are available. Having installed a 4G network infrastructure, a mobile network service provider is desirous of having as many users as possible exploit the advantageous data throughput of the 4G network. The user satisfaction for services provided via 4G networks will undoubtedly rise (in comparison to satisfaction in the 3G network experience) given the substantially greater data throughput of 4G mobile wireless technology. Fewer users on the 3G networks will reduce congestion on those networks as well. Thus, both current and former 3G mobile wireless network user experience/satisfaction is likely to rise when a substantial number of current 3G subscribers migrate to 4G mobile wireless devices/services.

Moreover, as mobile wireless service providers build out their network service, service "deserts" potentially arise within a market otherwise covered by a particular mobile wireless service provider. While operating in such service deserts, subscribers potentially operate in a roaming mode that can lead to unfavorable billing. Service providers can avoid negative reaction from subscribers by not charging a differential rate for roaming service—effectively absorbing the costs associated with providing roaming service to subscribers.

SUMMARY OF THE INVENTION

Embodiments of the invention are used to provide a system and method that enable policy-implementing modules in a mobile wireless data network to identify the location of a user and render policy-based (e.g., quality of service, accounting, throttling, etc.) decisions based upon a variety of additional information such as home network availability in a market, user class, time of day, localized (e.g., base station-specific) network congestion, application type, etc.

The system is configured to implement a method for managing use of mobile wireless data network services to render policy decisions by carrying out the steps of receiving a message generated for a mobile wireless data session for a mobile wireless device, the message including a geospatial identifier. Thereafter, a policy engine renders a data service policy decision by applying a policy to the geospatial identifier. The data service policy decision is applied to the mobile wireless data session. In particular, applying the data service policy decision includes at least whether to apply an in-market roaming mode (classification) to the mobile wireless data session. Thus, the geospatial identifier enables the policy engine to implement a potentially complex set of policies for individual users based upon a combination of pre-configured criteria and real-time network and user status.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 2 summarizes fields for a portion of an exemplary message passed to a home network routing node for users, the exemplary fields including geospatial identification information (e.g., a base station identification—or BSID) enabling location-based administration of users;

FIG. 3 is an exemplary table entry structure maintained by a AAA server that includes a BSID;

FIG. 4 is an exemplary SID list maintained by a home network to facilitate detecting in-market roaming;

DETAILED DESCRIPTION OF THE DRAWINGS

The figures and associated written description provide illustrative examples of a system and method for carrying out subscriber policy management functionality implemented by a home agent (HA), or similar mobile wireless network entity that operates as a home network router at least in the situation of a subscriber communicating via a roaming connection on a foreign mobile wireless network. The HA performs such routing for both home network and roaming data connections for mobile devices using Mobile IP (MIP) to establish a connection to the Internet. Enhanced subscriber policy management functionality is facilitated by the home agent's use of a Base Station Identification (BSID)—or other geospatial information—provided by an Authentication, Authorization, and Accounting (AAA) server/service. A home agent, as used herein, is a specialized router on a home network for handling communications by a mobile wireless device operating in a roaming mode on a foreign mobile wireless network. The home agent tunnels data for delivery to a roaming mobile wireless device. Such roaming occurs when the mobile wireless device establishes an air connection to a base station transceiver that is not part of the home network with which the mobile wireless subscriber device is associated. The HA maintains current location (IP address) information (i.e., care-of-address) for the roaming mobile wireless device. As such, the HA provides a mechanism for enabling communications between the roaming mobile wireless device and other network nodes while the mobile wireless device is roaming. Moreover, in cases where mobile devices use mobile IP (MIP) to establish a data connection to the Internet, the HA tracks data services uses regardless of whether the user is roaming or in a home network.

The HA's integral relationship to a roaming mobile wireless subscriber device presents an opportunity to utilize the HA to implement policies for roaming mobile wireless devices. In accordance with illustrative embodiments, the HA is provided with a BSID for a mobile wireless device. The BSID includes a combination of: System ID (SID), Network ID (NID) and Cell ID. The BSID, in view of its association with a particular cell site, provides physical location information with regard to a particular use of mobile wireless data transmission services using a mobile wireless device. Moreover, the HA provides information relating to received geospatial information (e.g., BSID) to a billing and rating functionality (engine) that appropriately charges and/or bills subscriber accounts in view of the identified geographic location of a mobile device when particular mobile wireless services were rendered.

Figure 1:
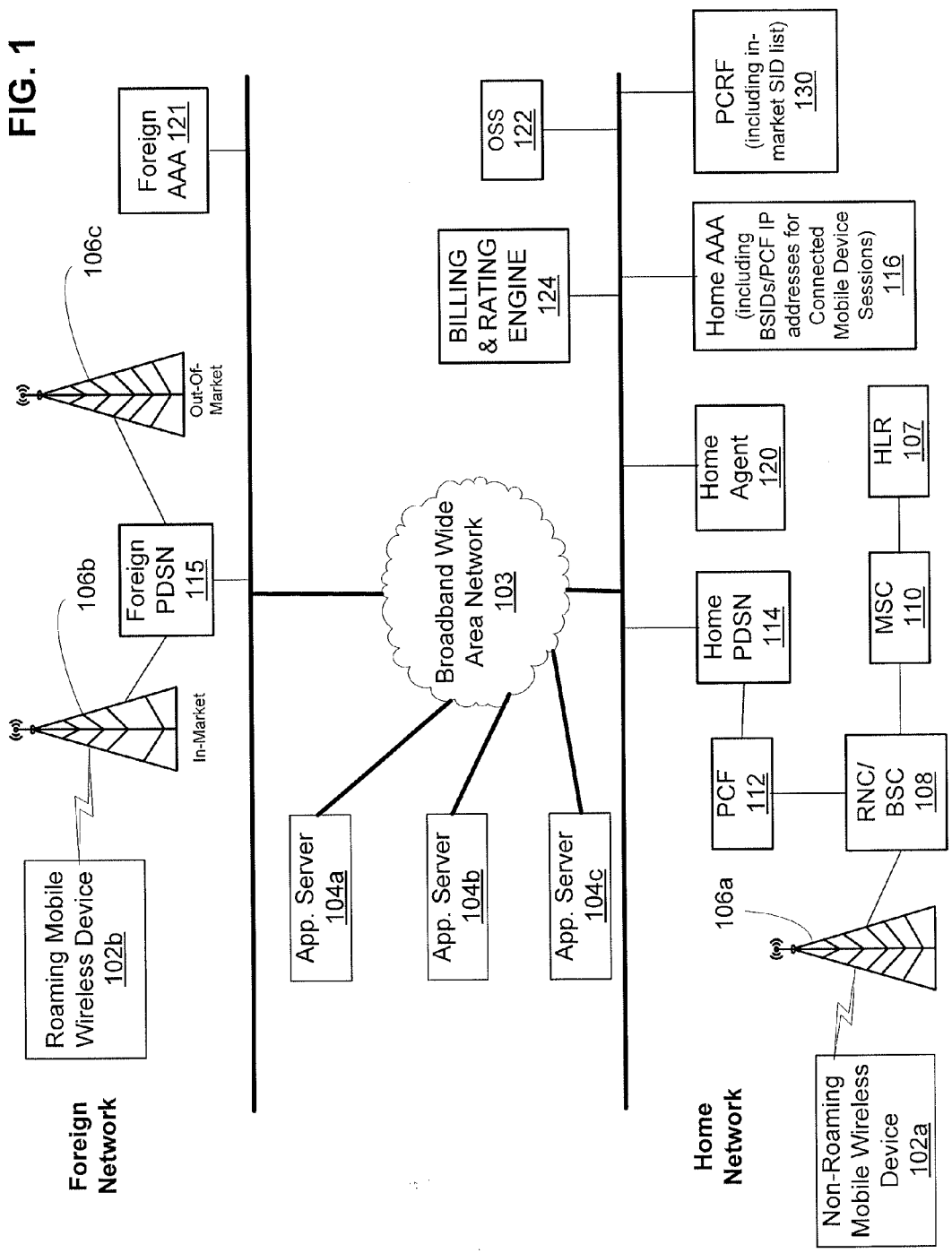
FIG. 1 is a schematic diagram illustrating a mobile environment interfacing a broadband digital data network to which a variety of application servers are coupled and are accessed by a mobile wireless device in accordance with an embodiment of the invention.

Turning to FIG. 1, a network environment is schematically depicted that includes monitoring and management components facilitating the aforementioned determination of a BSID for a base station transceiver/antenna to which a mobile wireless device is presently communicatively connected for purposes of supporting an Internet Protocol (IP) session (e.g., mobile IP). The illustrative embodiment includes a mobile wireless home network system (referred to herein as "home network system") that incorporates, by way of example, CDMA2000 and LTE based mobile wireless network components (e.g., AAA service for performing user authentication and providing user profiles) and includes data services delivered via one or more data access protocols, such as EV-DO, EV-DV or the like. Other embodiments include a wireless access network complying with one or more of WCDMA, UMTS, GSM, GPRS, EDGE, Wi-Fi (i.e., IEEE 802.11x), Wi-MAX (i.e., IEEE 802.16), or similar telecommunication standards configured to deliver data services to a mobile device 102a (in-network) or a mobile wireless device 102b (roaming). There is no intention to limit the invention to such environment since the enhanced functionality of the home agent (or similar routing node for supporting mobile wireless data network sessions by mobile wireless devices) arising from provision of a BSID of a mobile wireless device data session is potentially applicable to other mobile wireless environments (and alternative location-related identifiers). Such other mobile wireless environments include, without limitation, LTE based mobile wireless network systems and a PCF IP address (identifying a location with a substantially lesser degree of specificity than a BSID).

In the illustrative example, the home network system provides mobile wireless data network services via a base station 106a to the mobile device 102a. Embodiments of the mobile device 102a include a mobile phone, a PDA, or a mobile computer (e.g., a laptop, notebook, netbook, tablet, etc.) having mobile wireless capability.

The home network system includes a plurality of base stations, such as the base station 106a. The base station 106a, by way of example, includes radio bearer resources and other transmission equipment necessary for wireless communication of information between the mobile device 102a and other network elements on the home network.

The mobile device 102a is any of a variety of devices including, for example: a mobile phone, a PDA, or a mobile computer (e.g., a laptop, notebook, notepad, tablet, etc.) having mobile wireless data communication capability.

Mobile wireless devices are capable of operating in a "roaming mode" wherein the mobile devices (such as mobile device 102b) establish a connection to the HA 120 via a foreign base station 106b or 106c, a foreign PDSN 115, and a foreign AAA (FAAA) 121 operating within a foreign mobile wireless network.

The home network system is connected to a broadband wide area network 103 (e.g., the Internet). The broadband wide area network 103 provides digital data connectivity to a variety of application servers 104a, 104b, and 104c as well as connections to a foreign mobile wireless network system (referred to herein as "foreign network system"). The application servers 104a, 104b, and 104c are representative of millions of application server systems providing a variety of Web-based services via the Internet. Additional components, such as firewall servers, are not depicted within the home and foreign network systems depicted in FIG. 1 to reduce clutter.

Turning attention to particular components of the home network system, a home location register (HLR) 107 provides services for authenticating an identity of the mobile device 102 prior to permitting access to radio access network resources of the home network system. The HLR 107, by way of example, maintains a database of subscribers to the home network system. Each individual subscriber (e.g., each distinctly identified mobile device) entry includes a Mobile Identification Number (MIN) and/or Electronic Serial Number (ESN).

Moreover, for each data access network, radio access network resources are used to control the radio interface aspect of the home network system that includes the plurality of base stations. Control of the radio interface of the home network system is carried out, for example, by a radio network controller (RNC) or a base station controller (BSC), identified in FIG. 1 as RNC/BSC 108. The RNC/BSC 108 manages the radio traffic between a plurality of base stations such as the base station 106a. Such management of radio traffic includes controlling handoff between sectors and/or base stations.

Additionally, the home network system illustratively depicted in FIG. 1 includes a mobile switching center (MSC) 110. The MSC 110 manages voice calls placed in and out of the home network system.

Continuing with the illustrative schematic depiction of the home network system, a packet control function (PCF) 112 is communicatively coupled to the RNC/BSC 108. The PCF 112 carries out the function of routing data packets from the RNC/BSC 108 to one of a set of PDSNs. The RNC/BSC 108 is, by way of example, collocated with the PCF 112. It is noted that in the illustrative example, the home network system is depicted as having a single packet data serving node (PDSN)—i.e., PDSN 114, and in such instance the PCF 112 is not needed to perform the aforementioned routing to a particular one of multiple PDSNs. However, in cases where a wireless system comprises multiple PDSNs, the PCF 112 selectively routes data packets received from the RNC/BSC 108 to an appropriate one of the set of PDSNs for further processing. In the illustrative example, the PCF 112 functionality includes sending out a message indicating a new current BSID for an existing mobile IP session for a mobile wireless device (e.g., mobile wireless device 102*a*). Such enhanced functionality permits tracking the current geospatial location of particular users for purposes of applying a variety of location-based policies described herein.

The illustrative home network system includes one or more services (implemented in the form of computer executable instructions carried out by processors on one or more physical server machines) that authenticate and determine/designate access rights for particular identified entities prior to granting access to the home network system's data network transmission services. In the exemplary embodiment, such authentication services are provided by a home Authentication, Authorization, and Accounting (HAAA) service 116.

The HAAA service 116 carries out the task, during set up of a mobile wireless data network session for an identified subscriber associated with a particular mobile device (e.g., roaming mobile device 102*b*, non-roaming mobile device 102*a*, etc.), of ensuring that the subscriber associated with the mobile device 102*b* is allowed to use the data network resources provided via the home network system. The HAAA performs such authorization check regardless of whether the mobile device is roaming (mobile device 102*b*) in a foreign network or not roaming (mobile device 102*a*). After initially confirming the authenticity of the identified user seeking to establish a user session via the base station 106*a* of the home network, or one of the two base stations 106*b* and 106*c* in the foreign network, the HAAA service 116 provides a response including a profile for the identified user including, among other things, user permissions. The permissions can be implicit—e.g., the user is identified as belonging to a particular group—or explicitly listed in the profile assigned to the system. The HAAA service 116 maintains a user table identifying users/sessions and corresponding BSIDs regardless of whether the mobile device is in-network or roaming. The HAAA 116 also maintains a PCF IP address associated with the (currently non-roaming) mobile device 102*a*. An exemplary user table entry is depicted in FIG. 3.

In the exemplary foreign/home mobile wireless network system arrangement depicted in FIG. 1 the HA 120 operates as a mobile wireless data routing node in the home network for the roaming mobile device 102*b* (connected via the base station 106*b* and a foreign PDSN 115 in the foreign network). The HAAA service 116 specifies a profile to the HA 120 during start up of a session (e.g., MIP session) between a mobile device (e.g., the non-roaming device 102*a* or one of the roaming mobile device 102*b* and 102*c*) and the home network system. Thereafter, the HAAA service 116, in response to receiving data usage accounting information from a PDSN (e.g., home PDSN 114 or foreign PDSN 115), sends BSID information to the HA 120 within change of authorization (COA) messages. As such, knowledge of the geospatial location of the base station 106*a*, 106*b* or 106*c*, and/or geographic area covered by the PCF 112, enables associating a particular/general geographical location to the BSID/PCF IP address provided to the HA 120 for the non-roaming device 102*a* or the roaming mobile devices 102*b* and 102*c*. Providing an initial BSID to the HA 120 at the commencement of a new mobile IP session, and providing an updated BSID (or other geospatial location information) to the HA 120 when such information changes, enables the HA 120 to implement a variety of geospatial location-based policies. Such geospatial location-based policies include: specifying a minimum quality of service, throttling, applying roaming/non-roaming rates or data usage rules, generating advertisements and/or notices. Such policies are carried out in coordination with other functional components of an exemplary home network system described herein. However, in alternative arrangements, the policies are carried out almost entirely by the HA 120.

Upon completing the user authorization process for the use of data resources, via the HAAA service 116, the HA 120 forwards an IP address, received from the HAAA service 116, to the home PDSN 114 or foreign PDSN 115 (depending on where the mobile device has established an air connection). The PDSN 114 or 115, in turn, forwards the IP address to the mobile device 102*a* or 102*b*. In the illustrative example, the HA 120 is a router located on the home network of the mobile device 102*a* or 102*b*. The HA 120 tunnels packets from the home network to the mobile device 102*b* when the mobile device 102*b* is roaming. Moreover, in accordance with exemplary embodiments, the HA 120 implements roaming connection policies for subscribers in accordance with guidelines administered by subscriber policy management modules, such as a policy charging rules function (PCRF) 130. The PCRF 130 is depicted in FIG. 1 as a separate component on a home network. However, in view of the strong interdependence an cooperation between the HA 120 and the PCRF 130, it is contemplated that the functionality of the PCRF 130 is implemented as an extension of the HA 120 functionality—as opposed to operating as a physically separate component.

With regard to illustrative examples provided herein, the PCRF 130 administers subscriber and/or user-specific rules regarding services provided by, or through, the home network system. Such services include, among others, supporting a data connection for the mobile device 102*b* operating in a roaming mode. The PCRF 130 distinguishes between when the roaming mobile device 102*b* is connected to the in-market base station 106*b* and out-of-market base station 106*c* based upon a first SID (contained within the in-market SID list maintained by the PCRF 130) assigned to the base station 106*b* that differs from a second SID (not contained in the in-market SID list) assigned to the base station 106*c*. It is further noted that, in an alternative embodiment, the PCRF 130 maintains a BSID list instead of a SID list—providing a much higher degree of granularity when designating in-market and out-of-market areas for foreign network base stations.

An Operating Support System (OSS) 122 serves as a central point for administration, management, and provisioning of all network elements. Among other things, the OSS 122 administers the individual accounts of subscribers to the mobile wireless data network services provided by/through the home network system.

In accordance with an exemplary embodiment, the home network system further includes a billing and rating engine 124. As indicated in FIG. 1, the billing and rating engine 124 is a back office system that is configured to receive certain information, based upon subscriber usage information (including whether a mobile device is roaming) received from other components of the home network system. The billing and rating engine 124 communicates such information to the OSS 122. By way of example, the billing and rating engine 124 monitors information provided by the HA 120 indicating that the mobile device 102*a* or 102*b* is (or has been) operating in the roaming mode—as well as the quantity of data passed by the mobile device 102*a* or 102*b* while operating in the roaming mode. The billing and rating engine 124 issues a notification to the OSS 122 that the mobile device 102*a* or 102b is (or has been) operating in the roaming mode. The notification to the OSS 122, if not permitted under the current user profile for the mobile device 102a or 102b, initiates immediate and/or delayed responsive actions by the home network system to ensure that the mobile device 102a or 102b operates in accordance with the terms of a current user agreement and/or takes steps to change the subscriber agreement such that mobile device is permitted to operate in the roaming mode during future sessions.

The HA 120, in association with the PCRF 130, is able to carry out a variety of policies/rules as a consequence of the HA 120 receiving notification of an address (e.g., BSID or PCF IP address in a home network) from the HAAA 116 when the mobile device 102a,102b seeks to establish a mobile wireless data network connection via a base station in the home network (e.g., base station 106a) or via a base station in a foreign network (e.g., base station 106b). As noted herein below, applying a policy to current BSIDs is not limited to the HA 120 as such functionality is applicable to in-network mobile wireless device user sessions as a consequence of messages issued by the PCF 112 each time a BSID changes for a session.

As those of ordinary skill in the art will realize, the foregoing network elements of FIG. 1, including components of the home network system, are implemented via telecommunications equipment. Such telecommunications equipment includes one or more computer processors, as well as non-transitory computer readable media, such as RAM/ROM, solid-state memory, and/or hard drive memory and the like, which store computer executable instructions for executing embodiments of the methods described herein.

Turning to FIG. 2, an exemplary set of fields are identified for a COA message passed from the HAAA 116 to the HA 120. The COA message, relating to an established data connection for a mobile wireless device (e.g., mobile wireless device 102a or 102b), is sent by the HAAA 116 to the HA 120. The COA message includes, among other things, a BSID 200 (or other identification indicative of a current geographic location of the mobile wireless device) and, in the case of a home network connection, an IP address 202 of a PCF. The message also includes a unique user ID 204 that corresponds to the mobile wireless device associated with the home network within which the HAAA 116 provides it authentication/authorization services. The HAAA 116, by way of example, maintains a user session table identifying users/sessions and corresponding BSIDs (roaming and non-roaming sessions) and PCF IP addresses (non-roaming session).

In accordance with illustrative examples, the COA message is generated each time the mobile wireless device changes cells through which it communicates—causing the BSID associated with data usage to change. Such enhanced functionality with regard to identifying changes is facilitated by modifications to the PCF 112 to cause issuance of a notification to the Home PDSN 114 each time a BSID changes for an established user session. Such BSID changes are converted to requests issued to the PCRF 130 to apply a policy to the new BSID (or a portion thereof). Several examples of policy definitions applied by the PCRF 130 to provided BSID information are described herein.

The illustrative example, provided by FIG. 2, of the message passed from the HAAA 116 to the HA 120, includes data fields of a change of authorization (COA) RADIUS message in accordance with RFC 5176. As noted above, the HAAA 116 passes a BSID previously provided by a PDSN (e.g., Home PDSN 114 or Foreign PDSN 115) to the HAAA 116 in attribute number twenty-six (#26) of the COA RADIUS message—i.e., the "vendor specific attribute." Moreover, the HAAA 116 updates its user table and issues a new COA message from the HAAA 116 to the HA 120 when a new BSID is received from the PDSN 114 for an identified user/session.

Importantly, the HA 120, upon receipt of the COA message from the HAAA 116 including a BSID in the vendor specific attribute field (#26), issues a request to the PCRF 130 identifying the BSID and an identification relating to the roaming mobile device 102b (e.g., an account identification, user identification, a user/subscriber class, etc.). The PCRF 130, in turn, utilizes the geographic information implied by the BSID when applying a set of rules to the user. Particular roaming rules and use of the BSID (or other geospatial information provided in a message from the AAA 116) by the HA 120 are discussed herein below with reference to FIGS. 5, 6 and 7.

Turning to FIG. 3, a set of fields are depicted for an exemplary table entry in the HAAA 116 identifying a mobile wireless device (e.g., mobile device 102b) and a BSID for a base station (e.g., base station 106b) through which the mobile wireless device has established an air communications connection. A BSID field 300 includes a unique identifier provided by the base station to which a user session for a mobile device, identified in a user session ID field 304 is presently connected. A PCF IP address field 302 identifies, for a user session, a PCF IP address of a PCF (e.g., PCF 112) through which communications from the mobile device, identified in the user session ID field 304, pass en route to the HA 120.

FIG. 4 depicts an exemplary in-market SID list maintained by the PCRF 130 to identify instances where a roaming mobile wireless device has established a session and is operating within a portion of the home network in-market geospatial area that does not currently have data service coverage required by the roaming mobile wireless device (thus necessitating a roaming connection).

Figure 5:
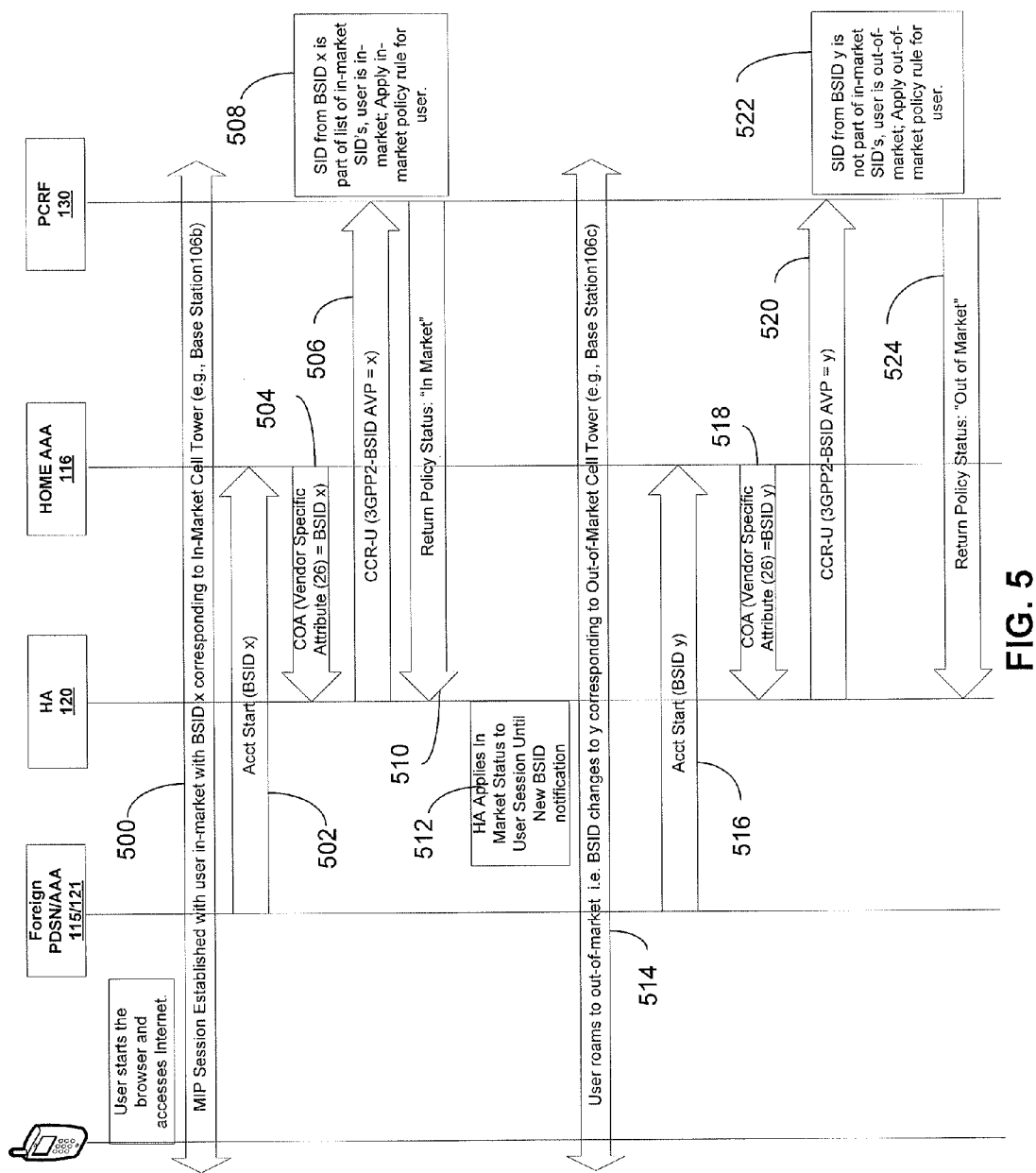
FIG. 5 is a sequence diagram depicting a series of operations/message flows associated with a BSID change for a user.

Turning to FIG. 5, a sequence diagram summarizes a set of steps for tracking assignment and subsequent changes to BSIDs assigned to mobile devices. The HA 120 and PCRF 130 cooperatively utilize geospatial information relating to a mobile device point of air connection, in particular BSID information provided by a base station through which the mobile device previously established a MIP session, to enforce/implement rules and policies associated with mobile devices' roaming/non-roaming use of mobile wireless data network services. In the particular example provided in FIG. 5, the HA 120 provides a BSID for the roaming mobile device (e.g., mobile device 102b) to the PCRF 130. The PCRF 130 compares the provided BSID to a list of in-market SIDs (or alternatively a list of in-market BSIDS) to determine whether the roaming mobile device is operating "in market" and thus treated as not roaming for purposes of billing. The PCRF 130 returns an "in/out-of-market" policy response. The HA 120 uses the in/out-of-market designation from the PCRF 130 when providing data usage notifications to the billing and rating engine 124. By way of example, the HA 120 does not designate the data usage as "roaming" if the roaming mobile device is operating "in-market" (i.e., in a geospatial area within specified boundaries of the home network that does not have home-network base stations). Other geospatial position-based policy/rule decisions are contemplated in various embodiments.

In the exemplary method summarized in FIG. 5, during step 500 a mobile Internet Protocol (MIP) session is established between the mobile wireless device 102b via an air access connection to the base station 106b in the foreign network. The base station 106b has a particular BSID. The BSID is a unique ID that enables determining a general geospatial location of mobile device 102b.

During step 502, in association with the newly established MIP session during step 500, the foreign PDSN 115 and AAA 121 issue a "start accounting" user data request (UDR) message to the HAAA 116. Among other things, the start accounting message includes a BSID assigned to the base station 106b in the foreign network.

During step 504, responsive to receiving the start accounting UDR message, the HAAA 116 issues a change of authorization (COA) message to the HA 120 associated with the new MIP session established by the mobile device 102b during step 500. The COA message, described previously herein above with reference to FIG. 2, includes a unique identifier assigned to the mobile device 102b and the BSID assigned to the base station 106b previously provided to the HAAA 116 during step 502. In an exemplary embodiment, the HAAA 116 provides the BSID in the vender specific attribute #26. However, other data identifying or indicative of the geospatial location of the base station 106b as well as the particular message/attribute used to convey the geospatial location data in a notification from the HAAA 116 to the HA 120 are contemplated in alternative implementations.

Next, during step 506 the HA 120 issues a request message to the PCRF 130 to apply a policy associated with the mobile device 102b based upon a newly established session status (i.e., the MIP session established via the base station 106b). The request includes at least: (1) the identifier assigned to the mobile device 102b, and (2) the BSID assigned to the base station 106b in the foreign network. The identifier assigned to the mobile device 102b enables the PCRF 130 to select a particular policy associated with an account with which the mobile device 102b is associated. The BSID assigned to the base station 106b, as noted above, enables the PCRF 130, during step 508, to apply a location-based rule to the MIP session of the mobile device 102b established through the base station 106b.

In a particular example, during step 508 the PCRF 130 applies an "in-market" roaming rule to the roaming MIP session established by the mobile device 102b through the base station 106b in the foreign network. In particular, the PCRF 130 compares the SID within the BSID provided during step 506 to a list of SIDs for foreign network base stations that provide air connection service within geospatial boundaries of a market for the home network system that are not covered by home network air service (i.e., base stations of foreign network base stations providing air connections for in-market out-of-network service locations—i.e., "service deserts" within the home network market geographical boundaries). It is noted that, in a particular embodiment, such foreign network base station BSIDs can be associated with femto cells provided within a building that prevents access to in-network cell sites within the geographic area. Thus, the term geospatial (a volume as opposed to an area) is used herein. In a particular example, a BSID assigned to a femto cell associated with one or more floors of a sky scraper is included in an in-market BSID list (as opposed to a more general SID list) maintained by the PCRF 130. In general, SIDs enable broad geospatial designations while BSIDs provide highly granular designations—at a potentially high administrative cost given the large number of base stations in a network region associated with a particular SID.

In the illustrative example, during step 508 the PCRF 130 locates a match between the SID within the BSID provided by the HA 120 and a SID within the in-market SID list. Thus, during step 510 the PCRF 130 returns an "In-Market" status in a response message to the HA 120. The in-market roaming status is intended to signify a data usage for which a user will not be treated as roaming. The in-market roaming policy is intended to enhance user satisfaction with the home network service provider since the customer is not penalized for data usage in geospatial locations, of a home network service provider market space, that one would not expect to rely on roaming connections.

Thus, continuing with the description of FIG. 5, during step 512, the HA 120 applies the particularized roaming status (provided by the PCRF 130) to data usage by the mobile device 102b while connected to the base station transceiver corresponding to the BSID processed by the PCRF 130 during step 508. The HA 120 later sends the status and tracked data usage information to the billing and rating engine 124 for purposes of properly billing the usage based upon the attached status (e.g., in-market roaming).

Continuing with the illustrative example in FIG. 5, during step 514 the mobile device 102b changes location resulting in a new BSID being assigned to the MIP session previously established during step 500. In this instance, the new BSID corresponds to an out-of-market BSID (i.e., the user is now roaming outside the market geospatial area). Thus, the user is not only out of network but also outside the home network service provider's defined market space. During step 516, the foreign PDSN 115 and AAA 121 issue a "start accounting" user data request (UDR) message to the HAAA 116. Among other things, the start accounting message includes a BSID assigned to an out-of-market base station in a foreign network.

During step 518, responsive to receiving the start accounting UDR message, the HAAA 116 issues a change of authorization (COA) message to the HA 120 associated with the new BSID assigned to the existing MIP session established by the mobile device 102b during step 500. The COA message, described previously herein above with reference to FIG. 2, includes a unique identifier assigned to the mobile device 102b and the new BSID assigned to the new foreign network base station previously provided to the HAAA 116 during step 516. In an exemplary embodiment, the HAAA 116 provides the new BSID in the vender specific attribute #26.

Next, during step 520 the HA 120 issues a request message to the PCRF 130 to apply a policy associated with the mobile device 102b based upon a new BSID provided during step 518. The identifier assigned to the mobile device 102b enables the PCRF 130 to select a particular policy associated with an account with which the mobile device 102b is associated. The BSID assigned to the base station, as noted above, enables the PCRF 130, during step 508 to apply a location-based rule to the roaming MIP session of the mobile device 102b established through the base station 106b.

During step 522, the PCRF 130 applies an "in-market" roaming rule to the roaming MIP session established by the mobile device 102b through the new base station in the foreign network. In particular, the PCRF 130 compares the SID contained within the new BSID provided during step 520 to a list of SIDs for base stations of foreign networks that provide air connection service within the geospatial boundaries of a market for the home network system that are not covered by home network air service (i.e., base stations of foreign network base stations providing air connections for in-market out-of-network service locations).

During step 522, the PCRF 130 is unable to locate a match between the new SID provided by the HA 120 and a SID within the in-market SID list. Thus, in contrast to step 510, the PCRF 130 returns an "out-of-market" status in a response message to the HA 120 during step 524. In such instance the HA 120 attaches an out-of-market status to the data usage of the mobile device 102b connected to the out-of-market base station transceiver. Such status can result in any one of a variety of subsequent actions initiated by the HA 120 including modifying: a minimum quality of service, a usage accounting classification, etc.

The "in-market roaming" policy is just one of many policies that are enabled by the HAAA 116 providing the BSID and/or PCF IP address to the HA 120. Another policy that is potentially applied to users based upon geospatial information provided to the HA 120 and processed by the PCRF 130 is "time-of-day" data usage limitation within regions of a home network that are susceptible to high congestion during particular times of day. In such case, the determinations are made at a BSID level of granularity.

Yet another policy is one based upon whether a next generation wireless data service is available in the geospatial location corresponding to the BSID. For example, if the provided BSID is for an earlier generation data communications protocol (e.g., CDMA) in a geospatial location served by the next generation wireless data service (e.g., LTE), then a data throttle is applied to the session. The throttling ensures sufficient data bandwidth to all users of the earlier generation protocol transceiver and encourages users to switch to the next generation technology where such throttling is not implemented.

Yet another policy is one based upon time of day limitations on data usage. Subscribers to data usage plans are offered terms that allow limiting usage (or providing services at a premium) based upon time of day and geospatial location of a base station through which a mobile device establishes a data connection. For example, based upon the time of day (e.g., 4-8 p.m.) data usage is throttled in certain highly congested locations. In each of the above policy applications (including combinations thereof), the HA 120 receives information indicative of geospatial location, such as a BSID assigned to a particular base station transceiver, and uses the information to establish a particular status for a mobile device. The status is thereafter conveyed to the billing and rating engine 124 for purposes of tracking data usage (divided into various classes based upon the status conveyed by the HA 120 (or any other reporting component such as the Home PDSN 114 in the case of a non-roaming user subject to a policy-based usage limitation) when reporting data usage by a mobile device in accordance with the sequence of messages summarized in FIG. 6.

In yet another example, the HA 120 applies the returned status, in combination with a current congestion status indicator associated with the BSID, to throttle data usage by particular mobile devices. Such throttling decisions are reached according to a provided congestion indicator for the base station transceiver corresponding to the BSID and user account-specific information such as current accumulated roaming data usage and usage plan class. Thus, for example, premium plans are not throttled while lower class plans are throttled during high congestion and/or when a user associated with the lower class plan reaches a particular data usage level. In yet another further enhancement to the above-described throttling policy, throttling is implemented based upon a detected type of application associated with a data stream associated with a user session subject to a policy applied by the PCRF 130. Such detection can be explicit or implicit (e.g., based upon a particular domain name associated with the data stream). In any event, the application type (or information indicative of an application type) is utilized to render a policy decision by the PCRF 130 resulting in throttling a mobile wireless user session.

Yet another geospatial location-based policy supported by the enhanced user location tracking information provided to the HA 120 is the ability to render location-focused advertisements. Thus, for example, the HA 120 can render sponsored messages based upon the proximity of the mobile device 102a and possibly other information including: a stored user demographic profile, a current time of day (e.g., lunch), etc. As noted above in the case of the PCRF 130, the functionality of generating geospatial location-focused advertisements based upon BSID information for a current user session can be implemented within the HA 120 or by a functional component that operates closely with the HA 120.

Figure 6:
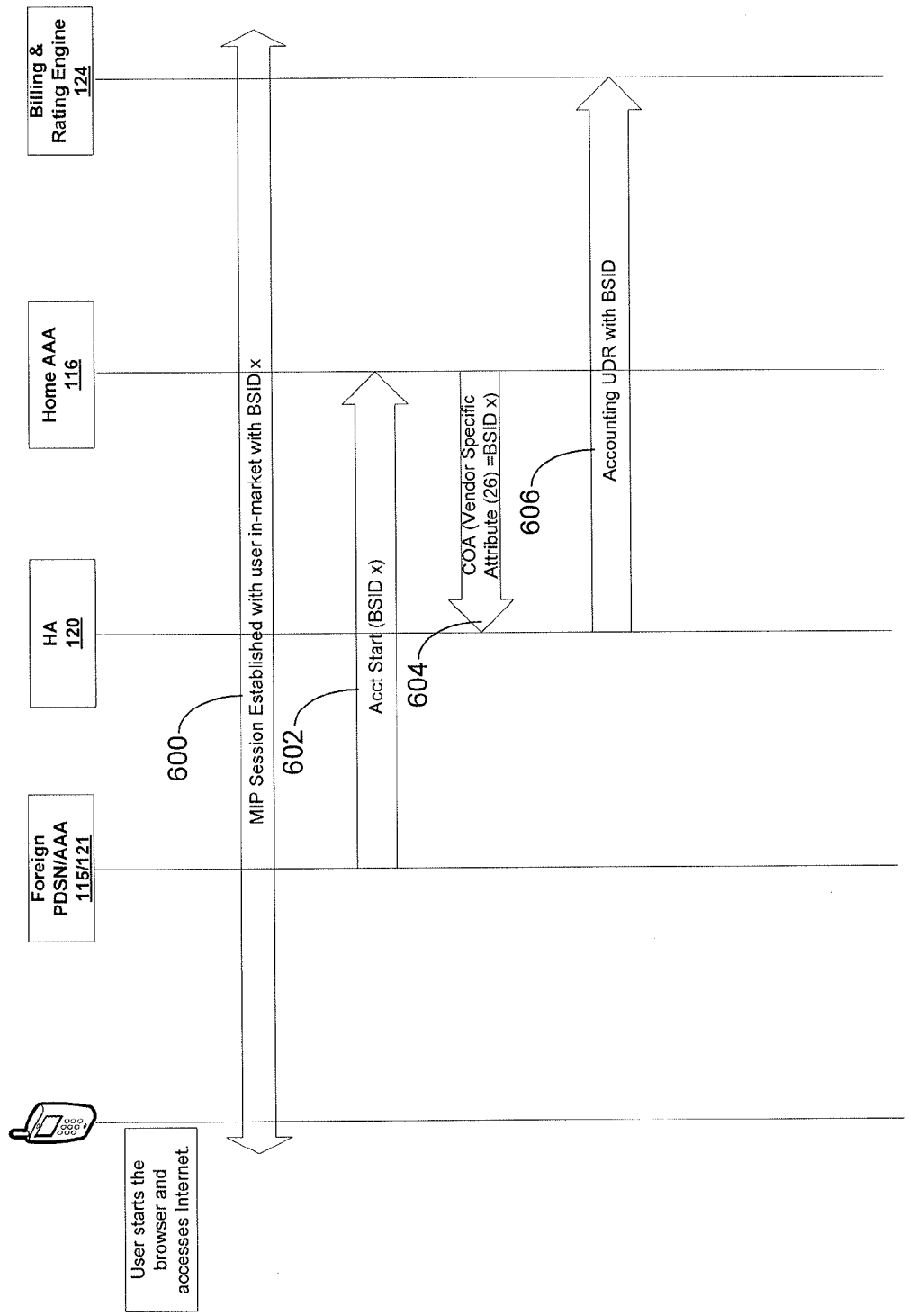
FIG. 6 is a sequence diagram depicting a series of operations/message flows associated with a routing node on a home network providing information to a billing service based upon detected BSID information provided by the AAA for a user.

Turning to FIG. 6, a sequence of steps are shown indicating messaging associated with an "in-market" roaming scenario discussed previously herein above with reference to FIG. 5. Steps 600, 602 and 604 correspond to steps 500, 502 and 504 of FIG. 5. However, step 606 differs from step 506 in that the BSID and mobile device identification are provided instead to the billing and rating engine 124. In this scenario, the billing and rating engine 124 processes the provided geospatial information (e.g., the BSID) similarly to the way in which the BSID was processed by the PCRF 130 during step 508. However, rather than return a status value, the billing and rating engine 124 tracks and differentiates in-market and out-of-market roaming by the mobile device 102b when calculating charges to a corresponding account.

Figure 7:
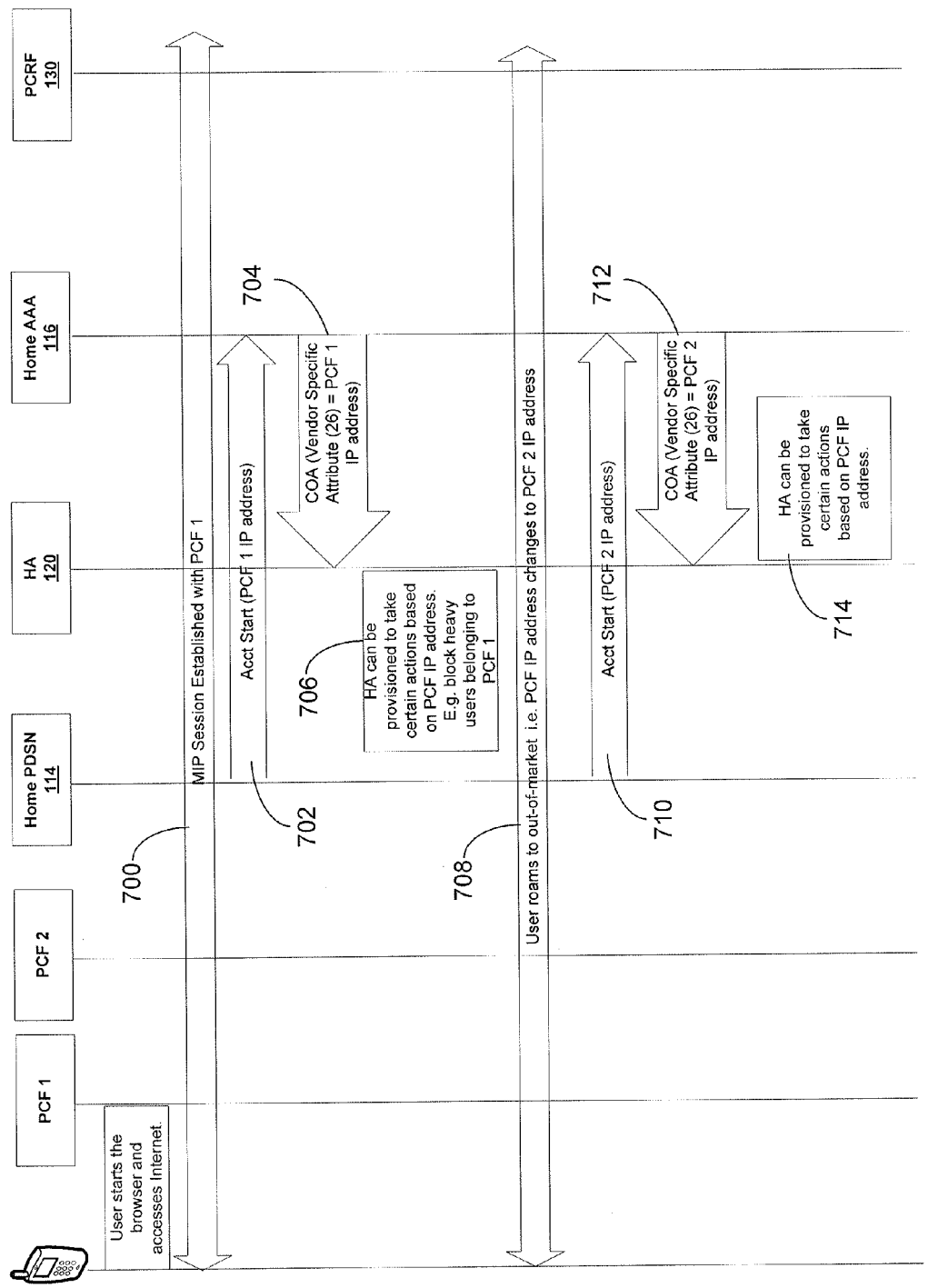
FIG. 7 is a sequence diagram depicting a series of operations/message flows associated with a packet control function IP address change for a user.

Turning to FIG. 7, a sequence of steps are shown for tracking a current PCF in a mobile wireless network having multiple PCF modules. This example is provided as an alternative to the location information provided by BSIDs—though with lower granularity. During step 700 the mobile device 102b establishes an MIP session with a first PCF within a same network. Thereafter, during step 702, in association with the newly established MIP session during step 500, the home PDSN 114 issues a "start accounting" user data request (UDR) message to the HAAA 116. Among other things, the start accounting message includes an IP address of the first PCF in the foreign network.

During step 704, responsive to receiving the start accounting UDR message, the HAAA 116 issues a change of authorization (COA) message to the HA 120 associated with the new MIP session established by the mobile device 102b during step 700. The COA message includes a unique identifier assigned to the mobile device 102b and the IP address assigned to the first PCF previously provided to the HAAA 116 during step 702. In an exemplary embodiment, the HAAA 116 provides the IP address of the first PCF in the vender specific attribute #26. However, using other particular messages/attributes to convey the geospatial location data in a notification from the HAAA 116 to the HA 120 are contemplated in alternative implementations.

Thereafter, during step 706, in a manner analogous to the PCRF 130 processing during step 508, the HA 120 applies a policy to the new MIP session based upon a geospatial location corresponding to the provided IP address for the first PCF. Examples of potential policies include blocking heavy data users associated with the first PCF that is known to be operating within a high data traffic region.

Thereafter, during step 708, the mobile device 102a changes location necessitating changing to a base station connected to a second PCF. In response, during step 710, the home PDSN 114 issues a "start accounting" user data request (UDR) message to the HAAA 116. Among other things, the start accounting message includes an IP address of the second PCF in the foreign network. By way of example, the first PCF is considered in-market and the second PCF is considered out-of-market by the policy applied by the HA 120.

During step 712, responsive to receiving the start accounting UDR message, the HAAA 116 issues a change of authorization (COA) message to the HA 120 associated with the new (second) PCF IP address. The COA message includes a unique identifier assigned to the mobile device 102b and the IP address assigned to the second PCF previously provided to the HAAA 116 during step 710. In an exemplary embodiment, the HAAA 116 provides the IP address of the second PCF in the vender specific attribute #26.

Thereafter, during step 714, the HA 120 applies a policy to the IP address for the second PCF. Examples of potential policies include blocking heavy data users associated with the first PCF that is known to be operating within a high data traffic region.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for managing use of mobile wireless data network services, the method comprising:
   receiving, by a home network mobile wireless data router, a message generated for a mobile wireless data session for a mobile wireless device, the message including a geospatial identifier;
   rendering, by a policy engine, a data service policy decision by applying a policy to the geospatial identifier; and
   applying, by the home network mobile wireless data router, the data service policy decision to the mobile wireless data session,
   wherein the data service policy decision comprises at least specifying an in-market roaming mode, by applying a definition of a geographic data network service market to the geospatial identifier, for the mobile wireless data session,
   wherein specifying the in-market roaming mode affects data service usage accounting for the mobile wireless data session.

2. The method of claim 1 wherein the geospatial identifier is derived from a base station identifier (BSID).

3. The method of claim 2 wherein the geospatial identifier consists of a system identifier (SID).

4. The method of claim 1 wherein the geospatial identifier consists of a packet control function (PCF) Internet Protocol (IP) address.

5. The method of claim 1 further comprising the step of:
   sending, by the home network mobile wireless data router, a billing message to an accounting service based upon the exception session mode.

6. The method of claim 1 further comprising, applying the geospatial identifier to render an unsolicited message to the mobile wireless device.

7. The method of claim 6 wherein the unsolicited message is a sponsored advertisement.

8. The method of claim 1 wherein the data service policy decision relates to a quality of service assigned to the mobile wireless data session.

9. The method of claim 8 wherein the policy engine specifies the quality of service based upon a combination of the geospatial identifier and a time of day.

10. The method of claim 8 wherein the policy engine specifies the quality of service based upon a combination of the geospatial identifier and a radio technology-based communications protocol used by the mobile wireless device.

11. The method of claim 8 wherein the policy engine specifies the quality of service for a session identified as roaming in view of the geospatial identifier and a time of day.

12. The method of claim 8 wherein the policy engine specifies the quality of service for a session identified as roaming in view of the geospatial identifier and a data network congestion indicator for a base station corresponding to the geospatial identifier.

13. The method of claim 12 wherein the policy engine specifies the quality of service for the session based additionally upon a data plan class assigned to a user account related to the session.

14. A non-transitory computer-readable medium including computer-executable instructions for facilitating managing use of mobile wireless data network services, the computer-executable instructions facilitating performing the steps of:
   receiving, by a home network mobile wireless data router, a message generated for a mobile wireless data session for a mobile wireless device, the message including a geospatial identifier;
   rendering, by a policy engine, a data service policy decision by applying a policy to the geospatial identifier; and
   applying, the by the home network mobile wireless data router, the data service policy decision to the mobile wireless data session,
   wherein the data service policy decision comprises at least specifying an in-market roaming mode, by applying a definition of a geographic data network service market to the geospatial identifier, for the mobile wireless data session, wherein specifying the in-market roaming mode affects data service usage accounting for the mobile wireless data session.

15. The non-transitory computer readable medium of claim 14 wherein the policy engine includes computer-executable instructions for rendering the data service policy decision relating to a quality of service assigned to the mobile wireless data session.

16. The non-transitory computer readable medium of claim 15 wherein the policy engine includes computer-executable instructions for rendering the data service policy decision relating to the quality of service based upon a combination of the geospatial identifier and a time of day.

17. The non-transitory computer readable medium of claim 15 wherein the policy engine includes computer-executable instructions for rendering the data service policy decision relating to the quality of service based upon a combination of the geospatial identifier and a radio technology-based communications protocol used by the mobile wireless device.

18. The non-transitory computer readable medium of claim 15 wherein the policy engine includes computer-executable instructions for rendering the data service policy decision relating to the quality of service based upon a combination of the geospatial identifier and a data network congestion indicator for a base station corresponding to the geospatial identifier.

19. A mobile wireless data network system configured to manage use of mobile wireless data network services comprising:
  a home network mobile wireless data router configured to receive a message generated for a mobile wireless data session for a mobile wireless device, the message including a geospatial identifier; and
  a policy engine for rendering a data service policy decision by applying a policy to the geospatial identifier; and
  wherein the home network mobile wireless data router is further configured to apply the data service policy decision to the mobile wireless data session, and
  wherein the data service policy decision comprises at least specifying an in-market roaming mode, by applying a definition of a geographic data network service market to the geospatial identifier, for the mobile wireless data session,
  wherein specifying the in-market roaming mode affects data service usage accounting for the mobile wireless data session.

\* \* \* \* \*